United States Patent
Brenneisen et al.

[11] 3,717,626
[45] Feb. 20, 1973

[54] WATER-INSOLUBLE PHENYL-AZO-PHENYL DYESTUFFS

[75] Inventors: Erich Brenneisen, Hofheim/Taunus; Helmut Lindner, Frankfurt/Main; Heinz Schmidt, Kelkheim/Taunus, all of Germany

[73] Assignee: Farbwerke Hoechst Aktiengesellschaft varmals Meister Lucius & Bruning, Frankfurt/Main, Germany

[22] Filed: Nov. 13, 1968

[21] Appl. No.: 775,515

[30] Foreign Application Priority Data

Nov. 28, 1967 Germany......................P 16 44 234.5

[52] U.S. Cl..........................260/207.1, 8/41 C, 8/50
[51] Int. Cl.........................C07c 107/06, C09b 29/08
[58] Field of Search...........................260/207, 207.1

[56] References Cited

UNITED STATES PATENTS 2,075,743    3/1937    Muller.................................260/207
2,155,755    4/1939    Felix et al............................260/207
2,177,427    10/1939   Felix et al........................260/207 X

*Primary Examiner*—Lewis Gotts
*Assistant Examiner*—C. F. Warren
*Attorney*—Curtis, Morris & Safford

[57] ABSTRACT

Water-insoluble monoazo-dyestuffs of the formula

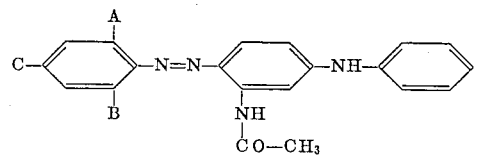

said dyestuffs being highly suitable for the dyeing of fibrous materials consisting of cellulose-2 ½-acetate, cellulose-triacetate, polyamide, polyurethane or, particularly, of polyesters, such as polyethyleneglycolterephthalates.

5 Claims, No Drawings

WATER-INSOLUBLE PHENYL-AZO-PHENYL DYESTUFFS

The present invention relates to new water-insoluble monoazo dyestuffs corresponding to the general formula(I)

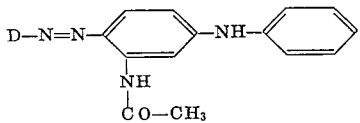
I wherein D represents the radical of a diazo component of the benzene series being free from groups imparting solubility in water, and to a process for preparing these dyestuffs, wherein aromatic amines of the general formula (II)

$$D - NH_2 \qquad II,$$

in which D is defined as above are diazotized and combined with a coupling component of the formula (III)

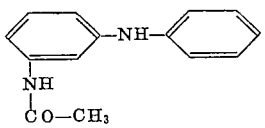
III

The benzene nucleus of the diazo component may carry groups which do not impart solubility in water, for example, nitro, cyano, trifluoromethyl, alkylsulfonyl, acetyl and/or carboxylic acid ester groups or chlorine and/or bromine atoms.

The coupling component used in the instant process corresponding to the general formula III can, for example, be prepared by the process described in J. Chem. Soc. (London), Volume of 1948 pages 1228–1229.

Amines from which the diazonium compounds used in the invention may be formed are, for example, the following: 4-nitroaniline, 2-chloro-4-nitroaniline, 2-bromo-4-nitroaniline, 2-cyano-4-nitroaniline, 2,4-dinitroaniline, 4-cyano-2-nitroaniline, 3-nitro-4-amino-benzotrifluoride, 5-nitro-2-amino-benzotrifluoride, 5-nitro-2-amino-benzoic acid methyl ester, 2,6-dichloro-4-nitroaniline, 2,6-dibromo-4-nitroaniline, 6-chloro-2,4-dinitroaniline, 6-bromo-2,4-dinitroaniline, 4-aminoacetophenone or (2-amino-5-nitrophenyl)-methylsulfonyl.

The coupling normally proceeds in an acidic to neutral medium to which acid-binding agents, such as sodium acetate or magnesium carbonate, may advantageously be added. The dystuffs, which are obtained in a water-insoluble form are, for example, separated by filtration and washed with water until free from the adhering electrolytes.

The new water-insoluble monoazo dyestuffs of the invention are processed by known methods with use of dispersing agents into dyeing compositions. These preparations yield at a very good ratio of dyestuff concentration employed to tinctorial strength obtained, on synthetic fibers, such for example, as cellulose triacetate, cellulose-2 ½-acetate, polyamides or polyurethanes, in particular, however, on polyester fibers, for example, polyethyleneglycol terephthalate, dyeings and prints distinguished besides a high intensity of coloration by a very good processing and application fastness, especially to light, wet processing and action of heat.

For dyeing polyester materials the new dyestuff are conveniently used in the form of the above-mentioned dyeing compositions either as powders or granules or suspensions capable of being poured. They are applied from an aqueous bath at temperatures above 100°C at a pressure or in the presence of known carriers at about 100°C. Another method providing intense shades consists in impregnating tissues or knit fabrics made of polyesters with suspensions of the new dyestuffs, drying and subsequently exposing to a short heat treatment, for example at a temperature between 190° and 210°C. Furthermore, the dyestuffs are highly appropriate for dyeing blends of fibers containing a portion of polyesters. In dyeing blends of polyesters and wool with a good color yield on the polyesters the wool portion is only faintly colored, so that the wool coloration can be easily removed by an additional treatment with reducing agents or emulsifiers.

The following Examples are to illustrate the invention but they are not intended to limit it thereto, the parts and percentages being by weight unless otherwise stated.

EXAMPLE 1

Seven parts of anhydrous finely pulverized sodium nitrite were introduced at 60°C into 120 parts of sulfuric acid of 96 percent strength. The resulting nitrosylsulfuric acid solution was, subsequently, cooled to 0°–5 °C at which temperature 16.3 parts of 2-cyano-4-nitroaniline were added and then stirred for 4 hours at 5°C.

The so prepared diazonium salt solution was run into a mixture consisting of 202 parts of ice, 202 parts of water and 1 part of amidosulfonic acid of 100 percent strength, to be poured, subsequently, into a solution of 23.3 parts of 3-acetoaminodiphenylamine of 100 percent strength and 200 parts of 99 percent glacial acetic acid. By addition of sodium acetate of 100 percent strength the pH value was adjusted to 4. The violet dyestuff which precipitated yielded, when applied on polyester fibers from an aqueous dispersion, dyeings very fast to light and thermofixation.

EXAMPLE 2

18.3 parts of 2.4-dinitroaniline were mixed with 158 parts of acetic acid of 99 percent strength and diazotized while stirred at 15°C with 32.3 parts of nitrosylsulfuric acid of 40 percent strength. 23.3 parts of 3-acetoamino diphenylamine in 250 parts of acetic acid of 99 percent strength containing as admixture 1 part of amidosulfonic acid of 100 percent strength were placed into the coupling vessel. To the said solution, adjusted with solid sodium acetate to a pH of 4 – 5, the diazonium salt solution was added dropwise with stirring within about half an hour, the temperature of 0 – 3°C being maintained by adding ice. Thereafter, it was stirred on for one hour. The obtained dyestuff dyed polyester fibers violet shades very fast to light and thermofixation.

EXAMPLE 3

20.7 parts of 2.6-dichloro-4-nitroaniline were diazotized as disclosed in Example 2. Thereafter, the diazonium salt solution was poured within half an hour with stirring into a solution of 23.3 parts of 3-acetaminodiphenylamine in 250 parts of acetic acid of 99 percent strength adjusted by means of solid sodium acetate to a pH between 4 and 5 that contained in admixture 1 part of amidosulfonic acid of 100 percent strength. During the coupling the temperature was kept between 0° and 3°C by addition of ice. The whole was stirred for 1 to 2 hours, the dyestuff which had precipitated was separated by filtration, washed with water and dried. The so obtained dyestuff showed a red coloration and when applied on polyester fibers from an aqueous dispersion yielded dyeings of outstanding fastness to light and thermofixation.

The following table contains further examples of dyestuffs obtainable by diazotization of the amines featured in column 2 and their coupling with 3-acetaminodiphenylamine. The fourth column lists the tints produced with these dyestuffs on polyethyleneglycolterephthalate fiber materials.

| No. | Diazo component | Azo component | Shade |
|---|---|---|---|
| 1 | 2-chloro-4-nitroaniline | 3-acetoaminodiphenylamine | Bluish red. |
| 2 | 6-chloro-3-nitroaniline | do | Reddish orange. |
| 3 | 4-cyano-2-nitroaniline | do | Bluish red. |
| 4 | 3-nitro-4-aminobenzotrifluoride | do | Red. |
| 5 | 5-nitro-2-aminobenzotrifluoride | do | Bluish red. |
| 6 | 5-nitro-2-aminobenzoic acid methyl ester | do | Do. |
| 7 | 2,6-dibromo-4-nitroaniline | do | Do. |
| 8 | 6-chloro-2,4-dinitroaniline | do | Violet. |
| 9 | 6-bromo-2,4-dinitroaniline | do | Do. |
| 10 | 4-aminoacetophenone | do | Scarlet. |
| 11 | (5-nitro-2-amino-phenyl)methyl-sulfone | do | Violet. |

What is claimed is:

1. A water-insoluble monoazo-dyestuff of the formula

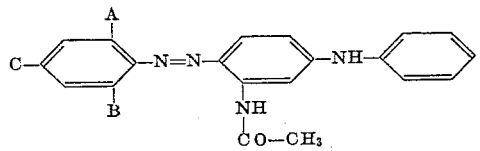

in which A represents hydrogen, chlorine, bromine, nitro, trifluoromethyl, lower alkylsulfonyl or a carboxylic acid lower alkyl ester group, B represents hydrogen, chlorine or bromine, and C represents nitro, trifluoromethyl or acetyl.

2. The water-insoluble monoazo-dyestuff of the formula

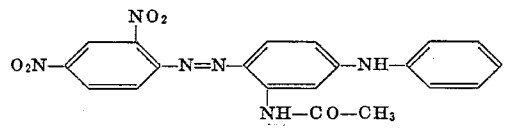

3. The water-insoluble monoazo-dyestuff of the formula

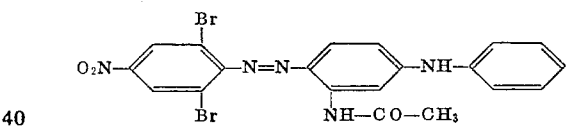

4. The water-insoluble monoazo-dyestuff of the formula

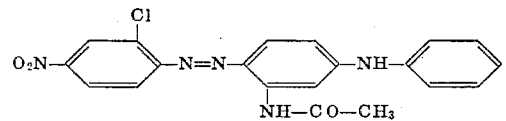

5. The water-insoluble monoazo-dyestuff of the formula

* * * * *